United States Patent Office 2,742,105
Patented Apr. 17, 1956

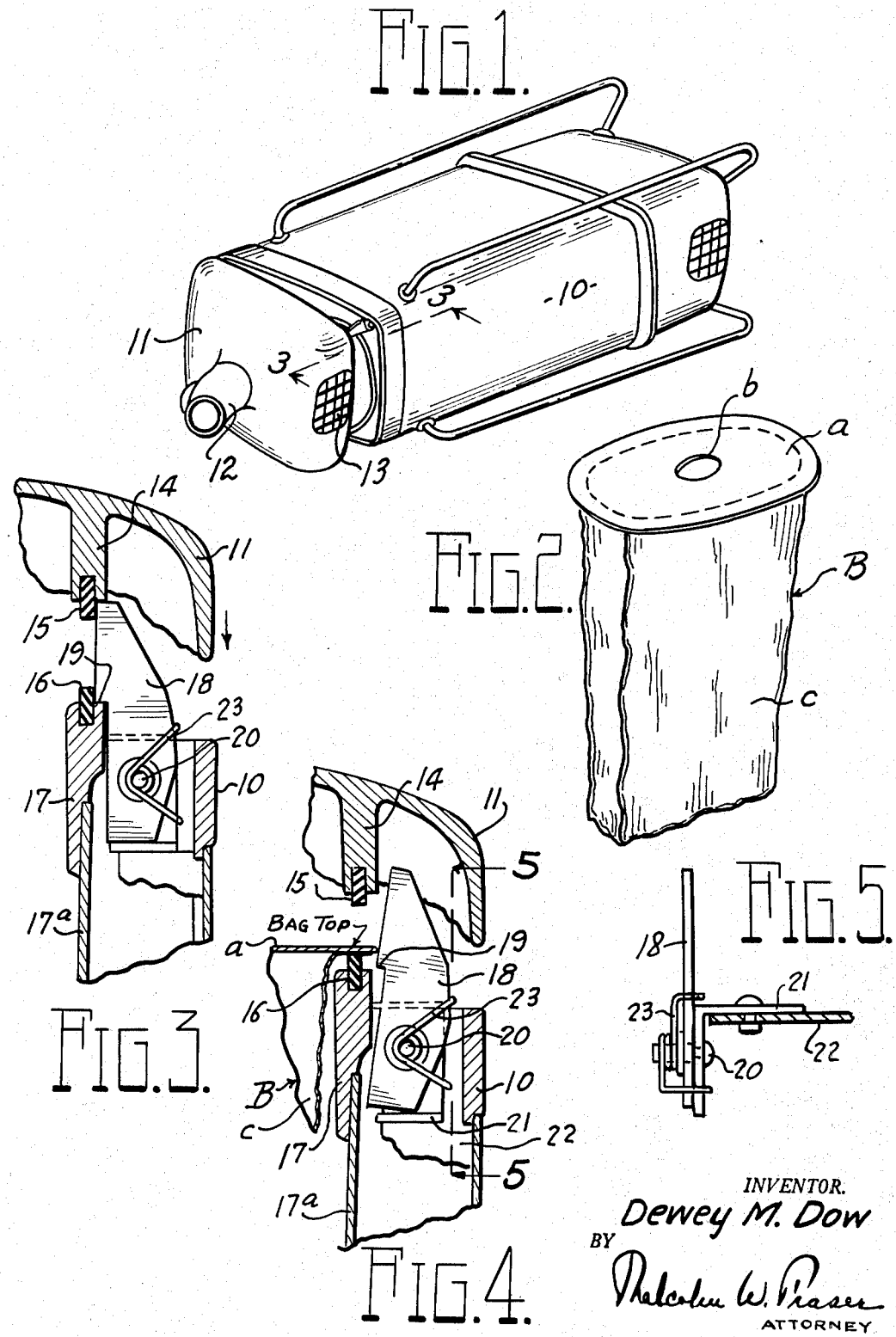

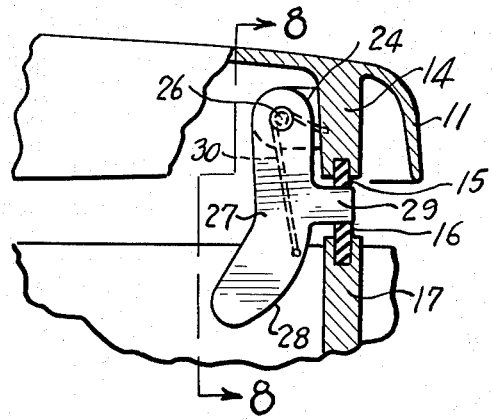
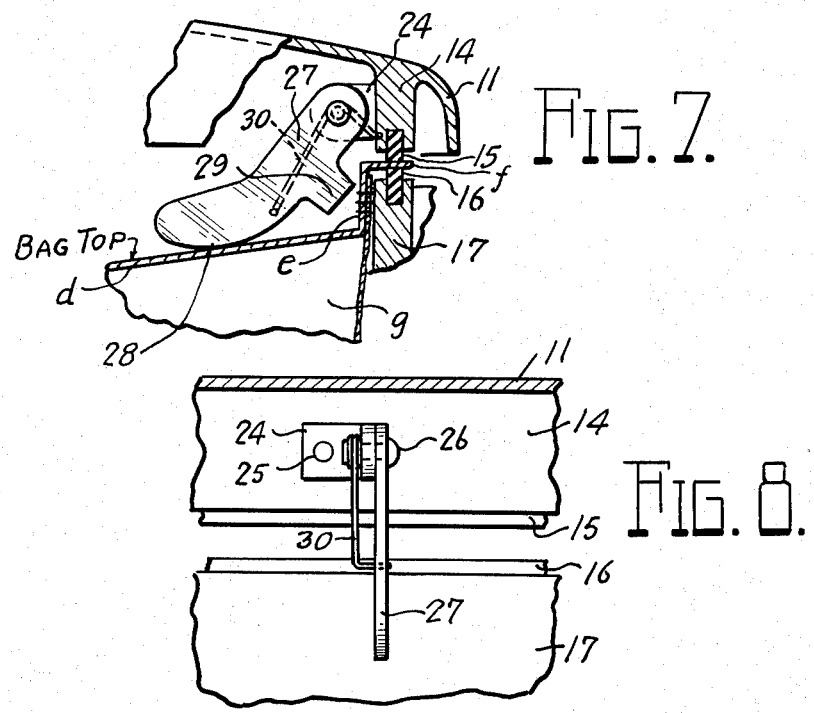

2,742,105

DEVICE FOR PREVENTING DUST FROM BEING DRAWN INTO A VACUUM CLEANER WHEN FILTER BAG IS NOT IN PLACE

Dewey M. Dow, Toledo, Ohio, assignor to Air-Way Industries, Inc., a corporation of Delaware Application December 11, 1953, Serial No. 397,560

8 Claims. (Cl. 183—43)

This invention relates to vacuum cleaners of the type employing a filter bag which after being filled with dust, dirt and foreign matter is discarded and replaced with an empty one.

Difficulty has heretofore been experienced with vacuum cleaners employing filter or dust bags because not infrequently after removing the filled bag, the operator will neglect to install a new bag with the result that dust and dirt is drawn into the machine covering the electric motor, fan and other parts with a layer which is damaging. This often requires costly repairs if it is allowed to continue a very long period. It is a desideratum to prevent dirt from being drawn into the vacuum cleaners when the filter bag is not in position of use within the machine.

An object is to overcome the above objections and to produce a simple and inexpensive device for militating against dust, dirt and foreign particles from being drawn into a vacuum cleaner where the filter or dust bag is not mounted within the cleaner.

Another object is to produce a means in a vacuum cleaner which will militate against closing of the cover unless the filter bag is in place.

A further object is to produce a new and improved means for a vacuum cleaner which positively blocks the closing of the cover when a filter bag is not in place but which permits cover closing when the bag is installed, the same being an entirely automatic and unobtrusive device, which can be readily installed on vacuum cleaners now in use as well as affording a device for convenient factory installation on new machines.

Other objects and advantages will hereinafter appear and, for purposes of illustration but not of limitation embodiments of the invention are shown in the accompanying drawings in which Figure 1 is a perspective view of a portable vacuum cleaner, the cover being shown open;

Figure 2 is a perspective view of a dust or filter bag;

Figure 3 is an enlarged fragmentary sectional view on the line 3—3 of Figure 1;

Figure 4 is a view similar to that of Figure 3 but showing the filter bag in place;

Figure 5 is a sectional view in the line 5—5 of Figure 4;

Figure 6 is a fragmentary sectional view of a vacuum cleaner showing an alternate form of device for preventing closing of the cover when a filter bag is not in place;

Figure 7 is a view similar to Figure 6 but showing a bag in place; and

Figure 8 is a sectional view on the line 8—8 of Figure 6.

The illustrated embodiment of the invention shown on Figures 1 to 5 comprises a portable electrically operated vacuum cleaner having a body or an outer sheet metal shell 10, at one end of which is a cover 11 suitably hinged at one end and secured by a latch (not shown) but having a latch plate 13, indicated on Figure 1 of the drawing. On the outer side of the cover 11 is a nozzle 12 which is usually swivelly mounted and receives the usual hose carrying the floor tool equipment for the cleaning of carpets, rugs, etc. It will be readily understood that a suction is created within the vacuum cleaner body 10 which creates a stream of air drawing in dirt, dust and foreign particles through the nozzle 12 into the machine and deposited, as will hereinafter appear, in a dirt or filter bag which, when filled, is emptied and replaced by a new one.

As shown in Figures 3 and 4 there is an integral depending annular wall 14 on the inside of the cover 11 and spaced inwardly from the outer wall of the cover. Carried by the outer end of the annular wall 14 is a rubber-like sealing ring 15 suitably socketed in the wall 14 as indicated. In order to effect a tight seal within the vacuum cleaner, the upper sealing ring 15 engages a lower sealing ring 16 when the cover is closed. The sealing ring 16 is carried by an annular rim member 17, which is fixed to an inner sleeve 17a spaced inwardly from and generally in parallel relationship to the outer shell 10 of the body.

Adapted to be clamped between the gaskets or sealing rings 15 and 16 is the rim portion of a dust or filter bag B. As shown, the filter bag has a relatively stiff cardboard top a which has a central hole b into which fits a nozzle (not shown) carried by the cover 11 to conduct the dust and dirt from the outer swivel nozzle 12 into the dust bag. Secured to the under face of the top a is an air pervious paper bag c which has a closed bottom end. It will be noted that the rim portion of the top cardboard member a projects outwardly from the side walls of the bag particularly as shown in Figure 4. This projecting portion rests upon the lower ring or gasket 16 and extends outwardly therefrom, as shown in Figure 4. It is desired to prevent closing of the cover 11 in the event the filter bag B is not in position thereby to prevent dust and dirt from entering the working parts of the vacuum cleaner.

Thus for the purpose of preventing the closing of the cover 11 unless a filter bag B is in place, a lever 18 which in this instance is in the form of a sheet metal stamping is disposed in vertical position generally between the inner wall or sleeve 17a and the outer sleeve or shell 10 of the vacuum cleaner body. As shown, the lever 18 on its inner edge has a shoulder 19. The lever 18 is pivotally mounted on an upset shouldered rivet 20 carried on an angle bracket 21 which mounts the device on a supporting plate 22, a fastener being employed for securing the bracket 21 to the supporting plate 22. The lever 18 is normally urged inwardly or in a direction toward the bag by a wire spring 23, the body of which is wound upon the rivet 20 and the ends engage respectively the lever 18 and the bracket 21.

The lever 18 is normally held in inoperative position when a filter bag B is in position of use as indicated in Figure 4. It will be osberved that the projecting rim portion of the bag top a projects outwardly from the sealing ring 16 a sufficient distance to engage the upper portion of the lever 18 and when in that position the cover 11 may be closed. However if no bag is in position of use, then the spring 23 rocks the lever 18 to the left as indicated in Figure 3 so that the shoulder 19 rides over the sleeve rim 17 and abuts against the sealing ring 16. In this position the top 11 cannot be closed because the lower end of the wall 14 will abut against the upper end of the sleeve 18 and prevent the closing movement. This prevents closure of the cover of the machine unless a filter bag is in place.

In the alternate form of the invention shown on Figure 6 to 8, it will be apparent that a mounting bracket 24 is connected to the inside of the annular depending wall 14 of the cover and this bracket is held in place by a screw 25. Pivoted to the inward portion of the bracket 24 on a rivet 26 is a lever 27 which extends downwardly from the bracket as shown on the drawings. On the lower end of the lever 27 is a downwardly and inwardly curved edge portion or cam 28, and above the cam 28 is an integral finger 29 which extends outwardly therefrom.

In this instance the bag top is also of relatively heavy cardboard or other similar sheet material and has a central opening to receive the dust but this is not shown on the drawing. The bag top in this instance is of dished form and consists of a flat cylindrical bottom wall d from which rises an annular wall e. The upstanding side wall e terminates in an outwardly extending rim portion f. Sewed to the annular side wall e is the mouth of the bag g of air pervious paper or the like. The bag has a closed bottom end similar to the bag above described.

In this instance it will be noted that the outwardly extending rim f is clamped between the gaskets or annular rings 15 and 16 and when a bag is in position of use, the cam portion 28 of the lever rides along the upper surface of the bottom wall g and rocks the projecting finger 29 away from the gasket members 15 and 16. However if no bag is within the vacuum cleaner, then as indicated on Figure 6 the lever 27 will swing to the position shown in Figure 6 with the finger 29 interposed between the gaskets 15 and 16. With the lever 27 in this position manifestly the cover 11 cannot be closed. A spring 30 which is wound about the rivet 26 and has one end abutting against the bracket plate 24 and the other end hooked upon the outer portion of the arm 27 urges the arm 27 in a counterclockwise direction (Figure 6) thereby to move the finger 29 into cover blocking position when no bag is in place.

From the above description it will be manifest that I have produced an exceedingly simple and inexpensive device for preventing closure of the cover of a vacuum cleaner without a filter bag in position of use. Thus the device operates entirely automatically and requires no attention. It can be readily installed on machines now in use and of course new machines can be conveniently equipped with the device at the factory.

Numerous changes in details of construction, arrangement and choice of material may be effected without departing from the spirit of the invention especially as defined in the appended claims.

What I claim is:

1. In a vacuum cleaner comprising a body member, a removable cover member normally fitting on said body member, a dust input connection on the cover member, and an air pervious filter bag normally in place within said body member, said filter bag having an apertured top of sheet material through which dust is normally drawn from said dust input connection, means for preventing the cover from being closed on the body member when the filter bag is not in place comprising, a blocking element moveably mounted on one of said members, said blocking element being moveable between an operative position in which the same prevents said cover member from fitting on the body member to an inoperative position in which said blocking element permits fitting of said cover member on said body member, said blocking element having means thereon engaged by said filter bag when the filter is normally positioned for moving said element to said inoperative position.

2. In a vacuum cleaner comprising a body member, a removable cover member normally fitting on said body member, a dust input connection on the cover member, and an air pervious filter bag normally in place within said body member, said filter bag having an apertured top of sheet material which dust is normally drawn from said dust input connection, means for preventing the cover from being closed on the body member when the filter bag is not in place, comprising a blocking element moveably mounted on one of said members, said blocking element being moveable between an operative position in which the same is interposed between said body and cover to prevent said cover member from fitting on the body member to an inoperative position in which said blocking element permits fitting of said cover member on said body member, said blocking element having means thereon engaged by said bag top when the filter is normally positioned for moving said element to said inoperative position.

3. A vacuum cleaner comprising a body open at one end to receive an air pervious filter bag having an apertured top of sheet material, a cover for closing said end and having an opening through which dust-laden air passes to the filter bag, a spring-tensioned arm having blocking means for preventing closing of the cover, and means on the arm engageable with the top of the filter bag for rocking the same to shift the blocking means, whereby the cover may be closed.

4. A vacuum cleaner comprising a body open at one end to receive an air pervious filter bag having an apertured top of sheet material, a cover for closing said end and having an opening through which dust-laden air passes to the filter bag, a spring-tensioned arm carried by the cover having blocking means for preventing closing of the cover, said blocking means constituting an integral projection on said arm, and means on the arm engageable with the top of the filter bag for rocking the same to shift the blocking means, whereby the cover may be closed.

5. A vacuum cleaner comprising a body open at one end to receive an air pervious filter bag having an apertured top of sheet material, a cover for closing said end and having an opening through which dust-laden air passes to the filter bag, a spring-tensioned arm having blocking means for preventing closing of the cover, and cam means on the arm engageable with the top of the filter bag for rocking the same to shift the blocking means, whereby the cover may be closed.

6. A device for preventing closure of a cover on a vacuum cleaner when a filter bag is not in place, the improvement comprising a vacuum cleaner body having an open end portion for receiving an air pervious filter bag, a cover movable to close such open end, a blocking member normally disposed to block closing of the cover, and means engageable with a filter bag when in place for shifting the blocking member out of the way to enable closing of the cover.

7. A device for preventing closure of a cover on a vacuum cleaner when a filter bag is not in place, the improvement comprising a vacuum cleaner body having an open end portion for receiving an air pervious filter bag, a cover movable to close such open end, a blocking member normally disposed to block closing of the cover, said blocking member being in the form of a spring-tensioned lever, and cam means engageable with a filter bag when in place for shifting the blocking member out of the way to enable closing of the cover.

8. In a vacuum cleaner comprising a body member, a removable cover member normally fitting on said body member a dust input connection on the cover member, and an air pervious filter bag normally in place within said body member, means for preventing the cover from being closed on the body member when the filter bag is not in place, comprising a blocking element moveably mounted on one of said members, said blocking element being moveable between an operative position in which the same prevents said cover member from fitting on the body member to an inoperative position in which said blocking element permits fitting of said cover member on said body member, said blocking element having means thereon engaged by said filter bag when the filter is normally positioned for moving said element to said inoperative position.

References Cited in the file of this patent

UNITED STATES PATENTS 2,322,948    Lofgren _____ June 29, 1943

FOREIGN PATENTS 429,351    Germany _____ May 21, 1926